(12) United States Patent
Piumarta

(10) Patent No.: US 7,748,725 B2
(45) Date of Patent: Jul. 6, 2010

(54) REINFORCED SKATEBOARD DECK

(75) Inventor: Timothy Piumarta, Soquel, CA (US)

(73) Assignee: NHS, Inc., Santa Cruz, CA (US)

( * ) Notice: Subject to any disclaimer, the term of this patent is extended or adjusted under 35 U.S.C. 154(b) by 297 days.

(21) Appl. No.: 11/940,233

(22) Filed: Nov. 14, 2007

(65) Prior Publication Data

US 2009/0121447 A1    May 14, 2009

(51) Int. Cl.
*B62M 1/00* (2010.01)

(52) U.S. Cl. .................... 280/87.042; 280/87.043; 280/87.05

(58) Field of Classification Search ... 280/87.01–87.05, 280/87.041, 87.042
See application file for complete search history.

(56) References Cited

U.S. PATENT DOCUMENTS

| | | | |
|---|---|---|---|
| 4,295,656 A | 10/1981 | Moore | |
| 5,649,717 A * | 7/1997 | Augustine et al. | 280/610 |
| 6,182,989 B1 | 2/2001 | Negele | |
| 6,386,561 B1 * | 5/2002 | Hanson | 280/87.042 |
| 6,527,284 B2 | 3/2003 | Bert | |
| 7,044,486 B2 | 5/2006 | Wright et al. | |
| 7,138,027 B1 | 11/2006 | Canizales et al. | |
| 7,347,431 B2 * | 3/2008 | Hill et al. | 280/87.042 |
| 7,506,880 B2 * | 3/2009 | Burwell | 280/87.042 |
| 2002/0185835 A1 * | 12/2002 | Wen | 280/87.041 |
| 2004/0003886 A1 * | 1/2004 | Hunter | 156/219 |
| 2004/0188967 A1 * | 9/2004 | Gallo | 280/87.041 |
| 2006/0049596 A1 | 3/2006 | Hill et al. | |
| 2006/0097469 A1 * | 5/2006 | Nosworthy et al. | 280/87.042 |
| 2008/0231009 A1 | 9/2008 | Hill et al. | |
| 2008/0238013 A1 | 10/2008 | Woodall et al. | |

\* cited by examiner

*Primary Examiner*—Glenn Dayoan
*Assistant Examiner*—Erez Gurari
(74) *Attorney, Agent, or Firm*—Advantage IP Law Firm

(57) ABSTRACT

A skateboard deck is provided with a first lower layer and an upper layer coupled to an upper surface of the first lower layer. The upper layer includes a top surface provided in part by a fiber-reinforced layer and in part a side barrier. The skateboard deck may further include one or more additional lower layers affixed beneath the first lower layer. The fiber-reinforced layer may be inlaid within the side barrier, which may be an outer portion of a wood veneer or thermoplastic sheet. The fiber-reinforced layer may be formed substantially of woven para-aramid fibers encased in an adhesive matrix.

36 Claims, 3 Drawing Sheets

APPLY ADHESIVE AND MAKE STACK READY TO GO TO PRESS

10" X 34.5"

KEEP WOOD FRAME     DISCARD 9.5" X 34.5"

KEEP KEVLAR OVAL    DISCARD

PRESS "PEEL APLY" ONTO TOP OF DIE CUT TOP.

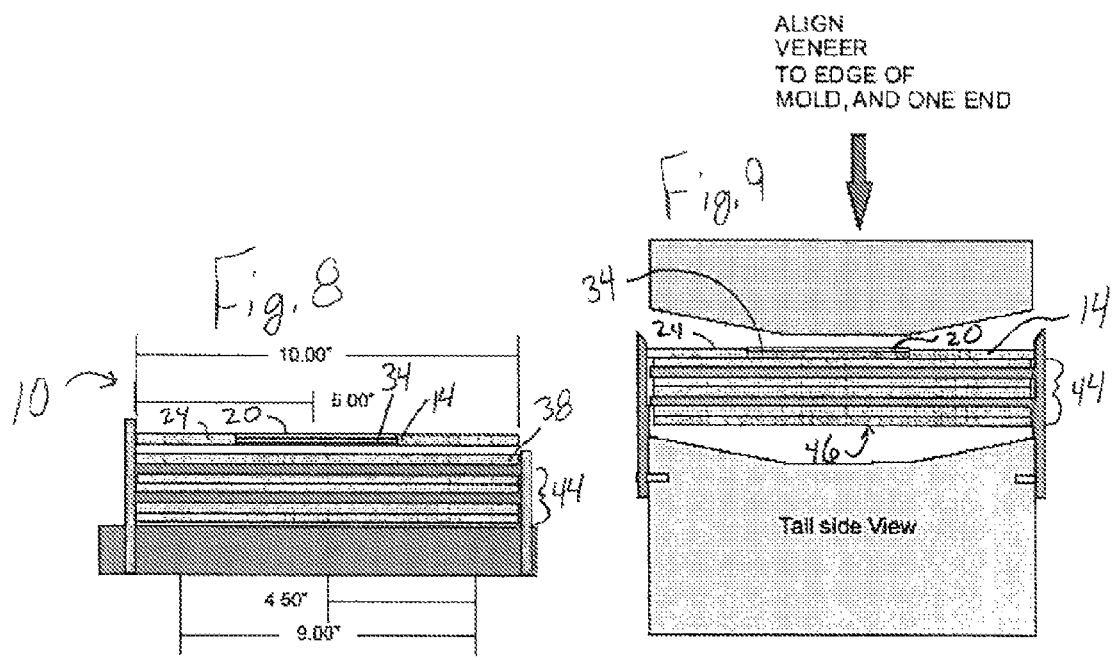
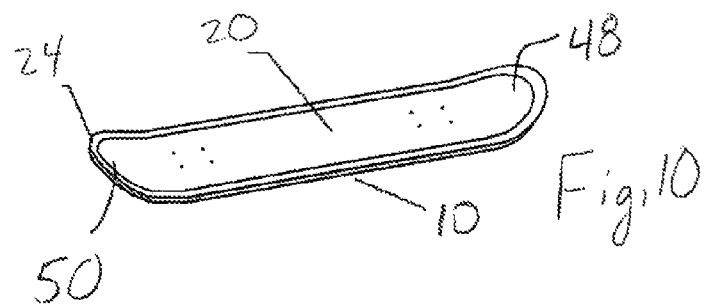

REINFORCED SKATEBOARD DECK

BACKGROUND

Skateboards are typically used today to ride up, over, and oft of ramps and other structures, and the skateboard deck undergoes considerable stress when the rider and skateboard return to the ground. Skateboard decks have been strengthened by a laminated structure typically a seven-ply hardwood with the grain direction of the plies varied to provide strengthening in more than one direction. Such laminate decks are still subject to failure under significant impacts during typical skateboarding use. It is believed that a common failure of the laminate deck occurs where the top layer of the laminate will fail in tension when loaded, then the second sub-layer below that will in turn fail in tension, and then the next and next, working from the top of the deck to the bottom surface.

Skateboard decks have also been provided with fiber reinforcement, typically a fiberglass and resin matrix such as epoxy or other thermosetting resin. Fiber reinforced skateboards are known in the art, with some designs placing the fiber reinforcement between the hardwood veneer layers, while other designs have the fiber on the bottom or top major surface of the skateboard. It is believed that the location where a fiber reinforcement has the greatest effect in strengthening against common failure-inducing loads is the top major surface of the skateboard. When fiber reinforcement is placed in such a way as to be firmly and permanently adhered to the top major surface of the skateboard, the common failure mode is prevented from initiating. This is believed to be because the tensile load is distributed over not only the laminate structure of hardwood veneers, but also by augmenting the strength of the laminate structure by the fiber and resin matrix reinforcement. Propagation of rupture of the laminated hardwood veneers is believed to be reduced, because the fibers are both adding stiffness to the structure, and adding overall tensile strength to the skateboard.

Providing a layer of fiber reinforcement over the entire major surfaces of the skateboard deck has practical drawbacks given the common nature of use of skateboards where the edges of the deck are worn away by contact with the ground. The result of such contact and wearing away is that fibers are exposed at the edge of the deck. These exposed fibers, particularly in the case of glass or carbon fiber can be rigid and sharp. In the case of other fibers, such as aramid, or para-aramids or other engineering thermoplastic fibers, the exposed fibers are typically soft and pliable, but in any case create a cosmetically unattractive edge.

SUMMARY

A skateboard deck according to one or more of the embodiments described herein includes a top surface for the rider's feet. A bottom surface of the deck provides for the connection of trucks and wheels. The top surface may be provided in part by a fiber-reinforced layer, while a further portion of the top surface may be provided by a side barrier extending around at least a portion of the fiber-reinforced layer. Typically, the fiber-reinforced layer and side barrier provide an upper layer of the board, which is coupled directly or through intermediate layers to a lower layer that provides the bottom surface.

Preferably, the fiber-reinforced layer is inlaid within the side barrier and is formed of woven para-aramid fibers, e.g., Kevlar®, encased in an adhesive matrix, such as polyurethane. The non-fiber-reinforced layers are preferably formed of a wood veneer or thermoplastic or any other suitable material.

The upper layer of the skateboard deck may be produced by removing a central portion of a wood veneer layer and by cutting a sheet of Kevlar encased in polyurethane to fit into the opening left in the wood veneer layer by removal of the central portion. These two steps my be performed by successively cutting the wood veneer and the Kevlar sheet by the same die. In assembling the layers of the deck, the fitted Kevlar sheet may be maintained within the central opening of the wood veneer by applying an adhesive tape over the fiber-reinforced layer and the side barrier.

Typically the layers are coated with adhesive on their adjoining surface and then press-molded, which may also be used to provide a raised nose and tail to the deck. The assembled layers may then be cut to a size and shape suitable for use as a skateboard deck. A skateboard may be assembled using the deck by adding a pair of trucks coupled adjacent the bottom surface of the deck, and coupling a set of wheels and bearings to the trucks. The skateboard may further include a grip tape affixed over the top surface of the deck.

The skateboard deck according to one or more of the herein described embodiments typically includes a fiber-reinforced layer that is protected from edge wear by inlaying within a wood veneer or thermoplastic sheet or by insetting the fiber-reinforced layer from the edge of the deck, or by other suitable protective means.

BRIEF DESCRIPTION OF THE DRAWINGS

FIG. 8 is an end elevation view of the layers arranged together, including a spacer layer beneath the fiber-reinforced layer, showing a typical dimension.

FIG. 9 is an end elevation view of a mold pressing the layers together to form a blank skateboard deck which may subsequently be cut to a desired size and shape.

FIG. 10 is a perspective view of a skateboard deck press molded to provide a raised nose and tail and cut to a final desired shape.

DETAILED DESCRIPTION

Figure 1:
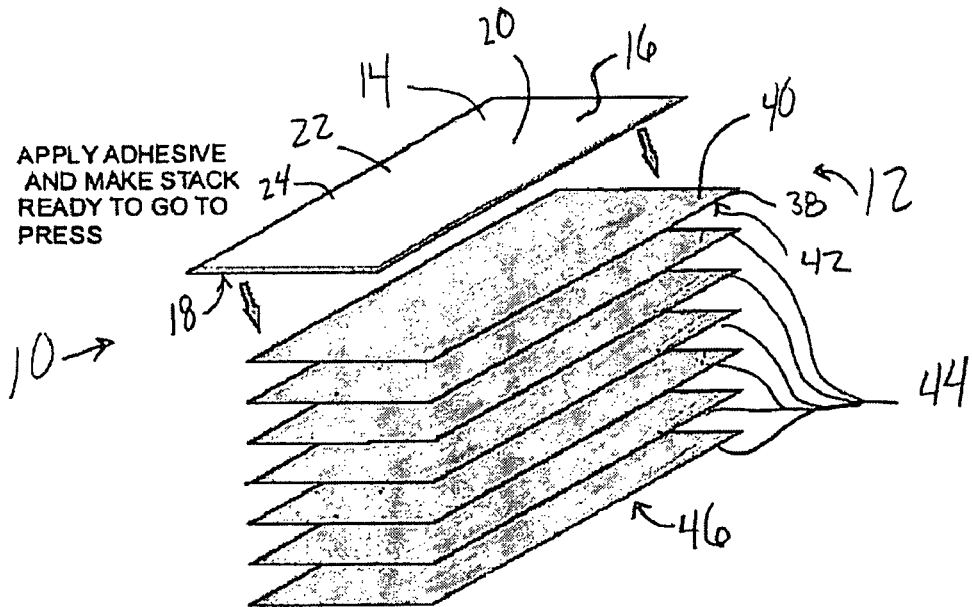
FIG. 1 is a perspective view of the layers of a skateboard deck in accordance with an embodiment of the present description, showing an upper layer formed of a fiber-reinforced layer inlaid within a veneer, and six additional layers, with varying strand orientations, prepared for assembly.

As shown in FIG. 1, a skateboard deck, indicated generally at 10, is typically formed of a series of wood veneer layers 12, which are stacked and assembled together. Alternatively, other suitable materials, such as thermoplastics, and non-layered constructions may be used.

An upper layer 14 provides a top surface 16 and a bottom surface 18. The top surface is typically the top structural surface of the skateboard deck, although a grip tape or other similar layer may be applied over the top surface. Upper layer 14 includes an inlaid, fiber-reinforced layer 20 that provides a portion of top surface 16.

Fiber-reinforced layer 20 is typically formed substantially of woven para-aramid fibers. The fiber-reinforces layer may be made with unidirectional or bi-directional para-aramid fibers loosely woven into a fabric. As an example, layer 20 may include Kevlar® fabric encased in an adhesive matrix. As an example, the Kevlar fabric may be substantially saturated with polyurethane, which is then allowed to harden before further processing. Other components of the adhesive matrix would include a resin of epoxy or polyvinyl.

Fiber-reinforced layer 20 defines an edge 22 (see also FIG. 5), and typically has an oval or racetrack shape, although other shapes may be used as desirable for a particular skateboard design.

Upper layer 14 typically includes a side barrier 24 which also provides a portion of top surface 16. Preferably, the side barrier and the fiber-reinforced layer together provide the entire top surface but alternatively other structure may provide a part of the top surface. Also preferably, the side barrier extends around the entire edge of the fiber-reinforced layer. Alternatively, the side barrier extends around only a portion of the edge of the fiber-reinforced layer, in which case some other structure may run alongside a portion of the fiber-reinforced layer or no structure as suitable to the desired skateboard design. The side barrier is typically a wood veneer, and as such includes the fibrous material that is naturally found in wood, however, the side barrier typically does not include any fiber reinforcement such as to leave behind a fringe or sharp edge of fibers as may be the case with Kevlar or glass or carbon fibers. Alternatively, side barrier 24 may be formed from a thermoplastic sheet.

Figure 2:
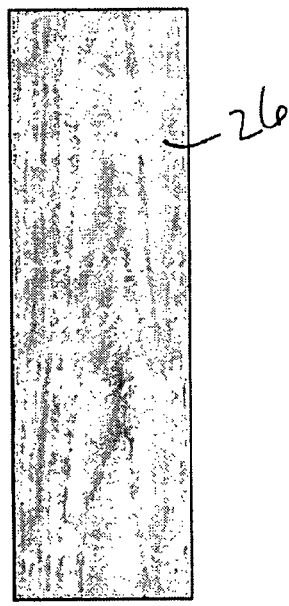
FIG. 2 is a top plan view of the veneer for the upper layer prior to an initial cutting, showing a typical dimension.
Figure 3:
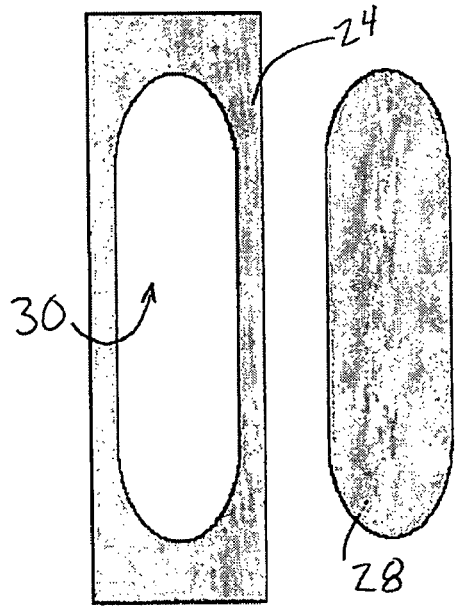
FIG. 3 is a top plain view of the veneer of FIG. 2 with a central portion removed to provide a side barrier defining a central opening.

As best seen in FIGS. 2 and 3, side barrier 24 is made by starting with a wood veneer blank 26 from which a central portion 28 is removed to provide a central opening 30, typically in an oval or racetrack shape, but alternatively with any shape suited to the specific skateboard. Thus, central opening 30 is defined by side barrier 24.

Figure 4:
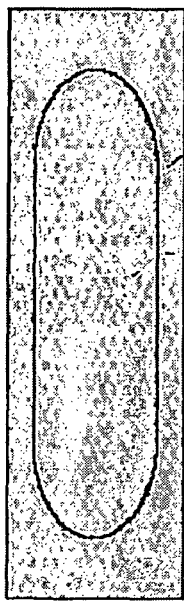
FIG. 4 is a top plan view of the fiber-reinforced layer for the upper layer, showing a typical dimension, prior to an initial cutting.
Figure 5:
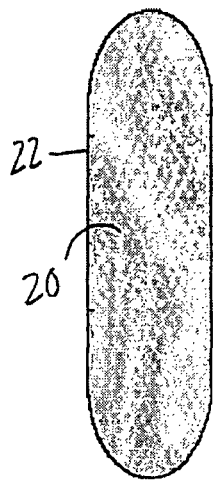
FIG. 5 is a top plan view of the fiber-reinforced layer, after cutting to a typical shape, to fit the layer into the central opening of the side barrier.

As best seen in FIGS. 4 and 5, fiber-reinforced layer 20 is made by starting with a sheet of woven Kevlar fabric 32 encased in an adhesive matrix, such as by substantial saturation with polyurethane. Sheet 32 is cut into an oval racetrack, or other suitable shape to produce layer 20, which is preferably closely fitted for central opening 30 of side barrier 24 (see FIG. 6).

Side barrier 24 and fiber-reinforced layer 20 are preferably die cut from blank 26 and sheet 32, respectively, but any suitable means may be used. With die-cutting, the same press and die may be used to cut both the blank and the sheet. Side barrier 24 and fiber-reinforced layer 20 are typically of equal thickness although some variation is permitted. Alternatively, the fiber-reinforced layer may be substantially thinner, with the difference made up by a spacer layer 34 (see FIGS. 8 and 9), typically of the same shape, such as oval, as fiber-reinforced layer 20. Spacer layer 34 may be affixed, e.g., by adhesive, to the bottom surface of fiber-reinforced layer 20, and may be cut to shape either separately or together with the fiber-reinforced layer.

Figure 6:
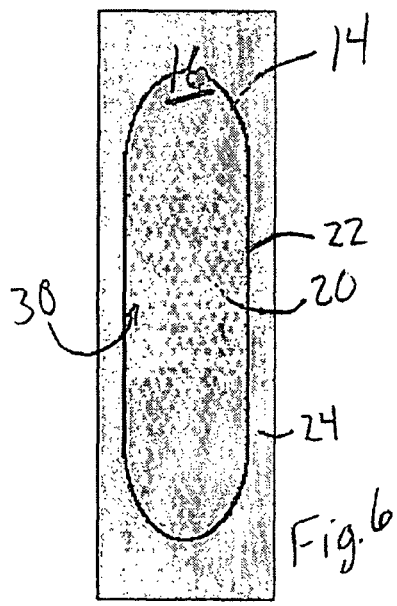
FIG. 6 is a top plan view of the fiber-reinforced layer and the side barrier assembled to provide the upper layer.
Figure 7:
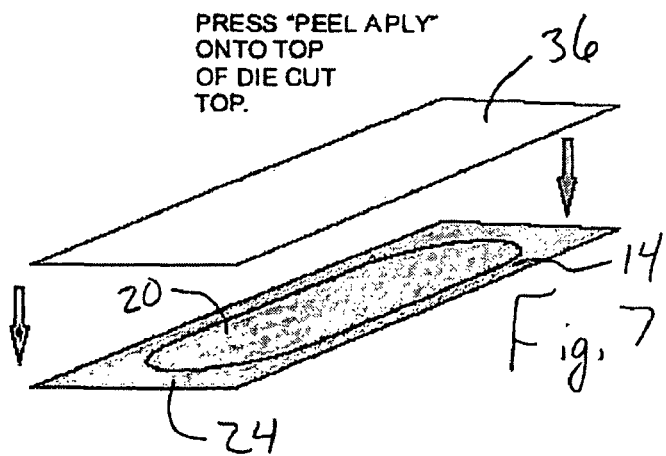
FIG. 7 is a perspective view of a removable adhesive tape being applied to the fiber-reinforced layer and the side barrier to hold them together.

As shown in FIGS. 6 and 7, after fiber-reinforced layer 20 and side barrier 24 are combined by placing layer 20 within central opening 30, they may be temporarily held together by application of an adhesive tape 36, e.g., the Peel A Play tape made by the R Tape Corporation of New Jersey. Adhesive tape 36 may be applied by a heat transfer press.

As best seen in FIGS. 1, 8, and 9, skateboard deck 10 may include a first lower layer 38, typically a wood veneer, defining an upper surface 40 and a lower surface 42. Upper layer 14, comprising side barrier 24 and fiber-reinforced layer 20, is affixed, typically by application of adhesive and subsequent press molding at suitable heat and temperature, to first lower layer 38. Additional lower layers may be included as desired in consideration of desired weight and strength factors. For example, second, third, fourth, fifth, sixth, and seventh lower layers 44, with ultimate bottom surface 46, may be affixed successively beneath the first lower layer, typically by application of adhesive and subsequent press molding at suitable heat and temperature.

Typically the lower layers are wood or other structural material with a strand orientation that is varied from layer to layer. As an example, with seven lower layers, two may be oriented to provide maximum cross board strength, while the remaining five maximize along board strength, although this scheme will be varied as appropriate for the desired performance characteristics.

FIGS. 1, 8, and 9 also illustrate that fiber-reinforced layer 20 is inlaid within side barrier 14, and side barrier 14 preferably surrounds substantially all of edge 22 of fiber-reinforced layer 20. As shown in FIG. 10, skateboard deck 10 may be press-molded to provide a raised tail 48 and a raised nose 50 and cut to a final desired shape. Furthermore, deck 10 may be drilled for truck mounting holes, and then trucks, bearing and wheels may be mounted to provide a skateboard ready for riding. A grip tape or other suitable tape, stickers or the like may be affixed over the top surface. Preferably the tipper surface of fiber-reinforced layer 20 and the upper surface of side barrier 24 are flush with one another, presenting a smooth transition with no visible step.

Alternatively, upper layer 14 may be formed substantially of an adhesive matrix including a central portion of woven fiber encased therein to provide the fiber-reinforced layer. In this embodiment, the adhesive matrix includes an outer portion without woven fiber to provide the side barrier.

As described herein, skateboard deck 10 includes a top surface 16 for the rider's feet, and a bottom surface 46 for the connection of trucks and wheels. The top surface is provided in part by a fiber-reinforced layer 20. The top surface is further provided by a side barrier 24 extending around at least a portion of the fiber-reinforced layer.

Typical thicknesses for the fiber-reinforced layer after saturation with polyurethanes are between about 0.010 to about 0.050-inches. Typical thicknesses for side barrier 14 is between about 0.040 to about 0.065-inches. The thickness of spacer layer 34 typically is adjusted to the appropriate thickness to accommodate the difference between fiber-reinforced layer 20 and side barrier 24 and provide a flush top surface 16. As an example, where side barrier 14 is 0.060-inches thick, and fiber-reinforced layer 20 is 0.020-includes thick, spacer layer 14 is preferably 0.040-inches in thickness. All of these dimensions may be varied within and beyond these ranges as suited to the particular skateboard design.

Side barrier 14 may have varying width dimensions relative to skateboard deck 10 and fiber-reinforced layer 20. The dimensions of the side barrier may be substantially uniform around the edge of the skateboard, or they may vary significantly as desired for specific skateboard characteristics. For example, the side barrier may be narrower along the sides as compared to the nose and tail. Side barrier 14 preferably has a minimum width of 0.125-inches along each long side of the skateboard. Side barrier 14 preferably has a width dimension between about 0.125-inches and about 6-inches adjacent the nose and tail of the skateboard. All of these dimensions may, be varied within and beyond these ranges as suited to the particular skateboard design. With this design, fiber-reinforced layer 20 is inset away from the edge of the skateboard, so that the fibers are shielded from contact when the skateboard edges are scraped on the ground or other surface. Fiber-reinforced layer 20 is preferably inlaid on top surface 16 of deck 10, and additionally or alternatively may be inlaid on lower surface 42.

The subject matter described herein includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements. It is believed that the following claims particularly point out certain combinations and subcombinations that are directed to one of the disclosed embodiments and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the present disclosure.

What is claimed is:

1. A skateboard deck comprising:
   a first lower layer, defining an upper and a lower surface; and
   an upper layer coupled to the upper surface of the first lower layer, the upper layer providing a top surface, the upper layer including a fiber-reinforced layer providing a portion of the top surface, the fiber-reinforced layer defining an edge, and the upper layer further including a side barrier substantially formed of a wood veneer and providing a portion of the top surface, the side barrier extending around at least a portion of the edge of the fiber-reinforced layer.

2. The skateboard deck of claim 1 further including a second lower layer affixed beneath the first lower layer.

3. The skateboard deck of claim 2 further including third, fourth, fifth, and sixth lower layers affixed successively beneath the second lower layer.

4. The skateboard deck of claim 1 wherein the fiber-reinforced layer is inlaid within the side barrier.

5. The skateboard deck of claim 1 wherein the side barrier surrounds substantially all of the edge of the fiber-reinforced layer.

6. The skateboard deck of claim 1 wherein the fiber-reinforced layer is formed substantially of woven para-aramid fibers encased in an adhesive matrix.

7. The skateboard deck of claim 1 wherein the fiber-reinforced layer is substantially saturated with polyurethane.

8. The skateboard deck of claim 1 wherein the side barrier is at least partially formed of thermoplastic.

9. The skateboard deck of claim 1 wherein the upper layer includes a wood veneer beneath the fiber-reinforced layer.

10. The skateboard deck of claim 9 wherein the fiber-reinforced layer is bonded by an adhesive to the wood veneer.

11. The skateboard deck of claim 1 wherein the upper layer is bonded by an adhesive to the lower layer.

12. A skateboard deck comprising:
   a first lower layer, defining an upper and a lower surface; and
   an upper layer coupled to the upper surface of the first lower layer, the upper layer providing a top surface, the upper layer including a fiber-reinforced layer providing a portion of the top surface, the fiber-reinforced layer defining an edge, and the upper layer further including a side barrier providing a portion of the top surface, the side barrier extending around at least a portion of the edge of the fiber-reinforced layer wherein the side barrier and the lower layer are formed substantially of wood, and further wherein the upper and lower layers are press-molded to provide a raised tail and a raised nose.

13. The skateboard deck of claim 1 wherein the fiber-reinforced layer and the side barrier together provide substantially all of the top surface of the upper layer.

14. The skateboard deck of claim 1 wherein an upper surface of the fiber-reinforced layer and an upper surface of the side barrier are flush with one another.

15. The skateboard deck of claim 1 wherein the fiber-reinforced layer and the side barrier are die cut.

16. A skateboard deck comprising:
   a first lower layer, defining an upper and a lower surface; and
   an upper layer coupled to the upper surface of the first lower layer, the upper layer providing a top surface, the upper layer including a fiber-reinforced layer providing a portion of the top surface, the fiber-reinforced layer defining an edge, and the upper layer further including a side barrier providing a portion of the top surface, the side barrier extending around at least a portion of the edge of the fiber-reinforced layer wherein the upper layer is formed substantially of an adhesive matrix including a central portion of woven fiber encased therein to provide the fiber-reinforced layer, and wherein the adhesive matrix includes an outer portion without woven fiber to provide the side barrier.

17. The skateboard deck of claim 1 further including a grip tape affixed over the top surface.

18. A skateboard deck for a rider to ride on, the deck comprising:
   a top surface for the rider's feet, and a bottom surface for the connection of trucks and wheels, the top surface provided in part by a fiber-reinforced layer, the top surface further provided by a side barrier substantially formed of a wood veneer and extending around at least a portion of the fiber-reinforced layer.

19. The skateboard deck of claim 18 wherein the fiber-reinforced layer and side barrier provide an upper layer of the board, and further wherein the bottom surface is provided by a lower layer of the board, wherein the lower layer of the board is coupled to the upper layer.

20. The skateboard deck of claim 19 further including at least five additional layers coupled between the upper layer and the lower layer.

21. The skateboard deck of claim 18 wherein the fiber-reinforced layer is inlaid within the side barrier.

22. The skateboard deck of claim 18 wherein the fiber-reinforced layer defines an edge and the side barrier extends around substantially all of the edge of the fiber-reinforced layer.

23. The skateboard deck of claim 18 wherein the fiber-reinforced layer includes woven para-aramid fibers.

24. The skateboard deck of claim 18 wherein the fiber-reinforced layer includes substantially encased in an adhesive matrix.

25. The skateboard deck of claim 18 wherein the fiber-reinforced layer includes fibers substantially saturated in polyurethane.

26. The skateboard deck of claim 18 wherein the side barrier is at least partially formed of thermoplastic.

27. A method for producing a skateboard deck comprising the steps of:
   providing an upper non-fiber-reinforced layer and a non-fiber-reinforced lower layer;
   removing a central portion of the upper layer to provide a central opening defined by a side barrier;
   providing a fiber-reinforced layer to fit within the central opening of the side barrier;
   placing the fiber-reinforced layer within the central opening of the side barrier;
   maintaining the layers in position by applying an adhesive tape over the fiber-reinforced layer and the side barrier;
   applying adhesive tape to the fiber-reinforced layer and the upper layer by a heat transfer press; and
   assembling the lower layer together with the side barrier and the fiber-reinforced layer.

28. The method of claim 27 wherein the central portion of the upper layer is removed by die cutting.

29. The method of claim 27 wherein the fiber-reinforced layer is fitted to the central opening of the upper layer by die cutting.

30. The method of claim 27 wherein the central portion of the upper layer is removed and the fiber-reinforced layer is fitted to the central opening by die cutting using a single die.

31. The method of claim 27 further including a step of providing a spacer layer fitted to the central opening of the upper layer and adhering the spacer layer beneath the fiber-reinforced layer.

32. The method of claim 27 the step of assembling the lower layer together with the side barrier and the fiber-reinforced layer includes applying an adhesive to the upper layer and the lower layer.

33. The method of claim 27 wherein the step of assembling the lower layer together with the side barrier and the fiber-reinforced layer includes pressing the layers together.

34. The method of claim 27 further including the steps of providing five additional lower layers and assembling them together with the side barrier and the fiber-reinforced layer and the lower layer.

35. The method of claim 27 further including a step, after assembling the lower layer together with the side barrier and the fiber-reinforced layer, of cutting the layers to a desired size and shape.

36. The method of claim 27 further including a step, after assembling the lower layer together with the side barrier and the fiber-reinforced layer, of pressing the layers to a desired shape.

* * * * *